July 20, 1965  H. W. JANSON  3,195,296
LINT FILTER BAG
Filed Jan. 18, 1963

United States Patent Office 3,195,296
Patented July 20, 1965

3,195,296
LINT FILTER BAG
Harry W. Janson, Fairhaven, Mass., assignor to Hoyt Mfg. Corp., Westport, Mass., a corporation of Massachusetts
Filed Jan. 18, 1963, Ser. No. 252,331
8 Claims. (Cl. 55—298)

This invention relates to a filter bag for removing particulate matter from a stream of gas and more particularly to a filter bag incorporating novel means for retarding the formation of a mat of particulate matter on the inner surface of such bag.

When a porous filter bag is employed to remove particulate matter from a stream of gas flowing therethrough, there is a tendency of the particulate matter to clog the pores of the bag and to form a mat thereon. If nothing is done to remedy this situation the gas will have difficulty penetrating the bag. Various expedients have been adopted in the past to overcome this problem but they have either been relatively expensive, such as shakers, rappers, or vibratory means, or they have reduced the efficiency of the bag because their violent action tends to drive the particulate matter through the pores of the bag, as in the case of a slack ribbon positioned along the axis of the bag. On the other hand, without these expedients all too frequent cleaning of the bag is required.

It is therefore a prime object of this invention to provide a highly efficient filter bag which is self-cleaning over an extended period of time and which is inexpensive to manufacture.

To accomplish the purposes of this invention, a filter bag with an open end to receive a stream of gas is provided with a plurality of spaced, thin, flexible strands disposed longitudinally about the inner tubular surface of the bag. The strands are affixed, at least at both ends thereof, to the inner tubular surface of the bag and are provided with just sufficient slack between their points of attachment so that they will operate on overlapping areas of the inner surface of the bag. When a stream of gas flows through the bag, the strands move along the inner surface of the bag in a wiping motion to clear therefrom any accumulation of particulate matter thereon.

Other features, objects and advantages of this invention will be apparent to those skilled in the art from the following detailed description thereof together with the accompanying drawing wherein.

Figure 2:
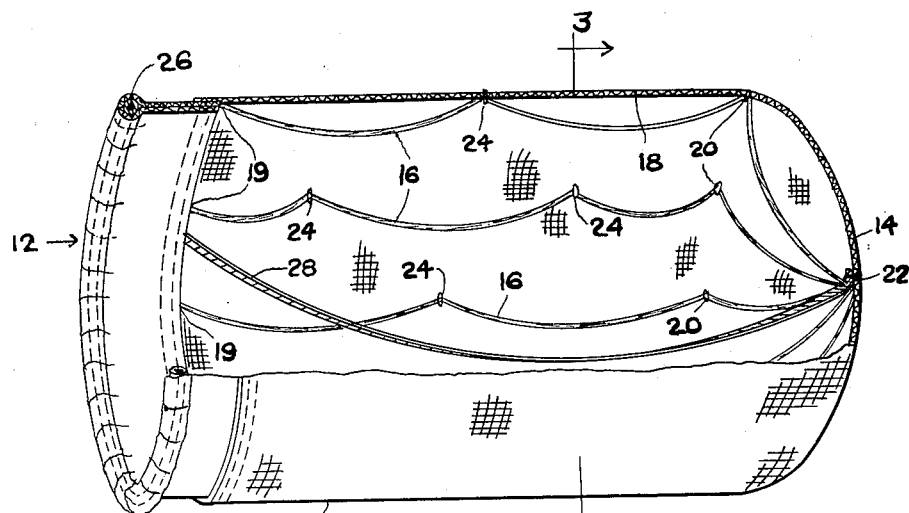
FIG. 2 is an enlarged isometric view, partly in section, of the filter bag shown in FIG. 1 rotated clockwise on its axis about 100°.
Figure 3:
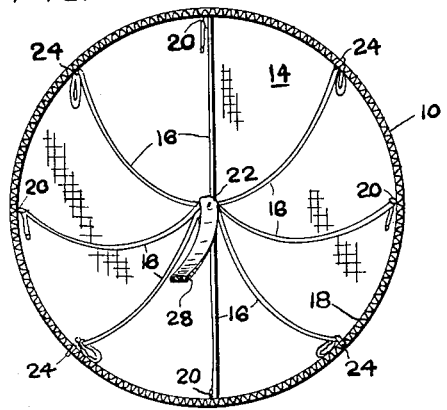
FIG. 3 is a cross-sectional view of the bag shown in FIG. 2 taken along the lines 3—3 thereof.
Figure 4:
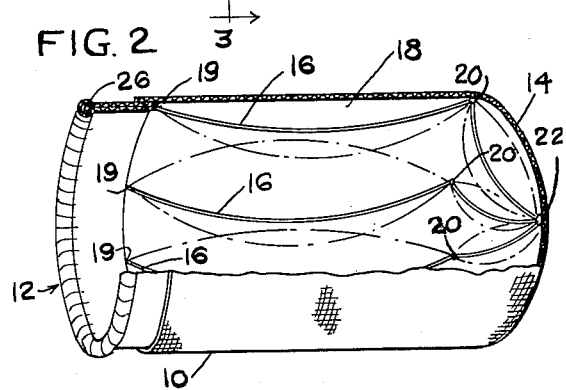
FIG. 4 is a reduced view similar to that of FIG. 2 of a preferred embodiment of the invention showing in the broken lines the areas operated upon by the several strands.

Referring now to the drawings and more particularly to FIGS. 2, 3 and 4 thereof, a tubular bag 10 of porous material is provided. The bag 10 has one end 12 which is open for receiving a stream of gas to be filtered. The other end 14 of the bag 10 is closed and extends generally radially outward to the tubular portion 18 thereof.

A plurality of thin, flexible strands 16 are longitudinally positioned in spaced relation along the inner tubular surface 18 of the bag 10. In the preferred embodiment of this invention, FIG. 4, the strands are attached to the inner tubular surface 18 of the bag 10 only at 19 adjacent the open end 12 thereof and at 20 where the closed end 14 of the bag 10 joins the inner tubular surface 18 thereof. If desired, however, the strands 16 may also be attached at intermediate points 24 along the tubular surface 18 of the bag 10. Preferably, the strands 16 extend to and are additionally attached to the center 22 of the radially extending closed end 14 of the bag.

Each strand 16 is provided with slack between its points of attachment 19, 20, 22, 24 to permit limited movement thereof upon the introduction of a turbulent stream of gas into the bag. Slack is provided by using strands having a length about 5% greater than the distance between points of attachment, which is about the permissible amount of slack that can be reliably used while preventing the strands from beating the bag, with consequent undesired particulate matter transmission therethrough.

The spacing between adjacent strands is arranged so that they will overlap and sweep substantially the entire inner tubular surface 18 of the bag as shown in broken lines in FIG. 4. A satisfactory spacing arrangement has been achieved in the preferred embodiment of this invention by spacing adjacent strands from each other a distance bearing a relation to the distance between the principal points of attachment 19, 20 of the strands in a ratio of 1:8.2. In any event, the spacing is preferably no greater than will just permit adjacent strands to overlap.

Figure 1:
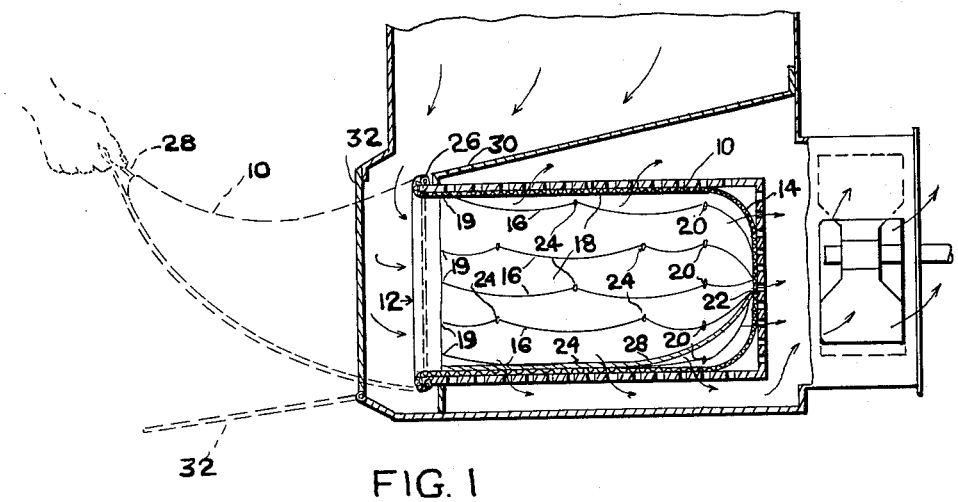
FIG. 1 is a side elevation in section of one embodiment of the present invention, mounted for operation in suitable apparatus, the broken lines indicating a preferred mode of cleaning said bag.

Preferably, means 26, such as a spring may be provided at the open end 12 of the bag for removably attaching the bag 10 to a cylindrical retaining ring or collar 30 as in FIG. 1.

Finally, to facilitate the emptying of the bag when intermediate points of attachment 24 are utilized, an additional strand 28 may also be provided which is attached only at the ends 12, 14 of the bag. Thus, when the bag is to be emptied, it is readily inverted by pulling the strand 28. Preferably the strand 28 is placed on the lower surface of the bag prior to use to prevent its beating the bag when the system is operated.

In operation, a stream of gas containing particulate matter is introduced at the open end 12 of the bag 10. As the particulate matter collects along the tubular surface 18 of the bag, the turbulence of the gas causes the strands 16 to move in a sweeping fashion across substantially the entire inner tubular surface of the bag thus wiping from overlapping areas thereof the collected particulate matter which then moves toward the closed end 14 of the bag where it is finally collected. If strands 16 are also provided in the closed end 14 of the bag the sweeping motion thereof also causes the particulate matter to concentrate in the center thereof, thus maximizing the clean area in the bag.

The tendency to force the particulate matter through the pores of the bag is minimized by the avoidance of any violent beating action, the strands being both removed from the main turbulence of the gas flow and subject to only limited movement on the surface of the bag. Moreover, as the bag begins to fill, the motion of the strands ceases where they underlie the collected particulate matter, thus further minimizing any tendency to drive such matter through the pores of the bag.

Thus, it may be seen that a highly efficient filter bag is provided which is self cleaning over an extended period of time. Moreover, it avoids the problem, encountered in certain expedients previously adopted, of driving the particulate matter through the bag because of the violent action utilized to clean the bag.

It will be understood by those skilled in the art that modifications of this invention are possible without departing from the spirit and scope thereof wherefore nothing aforesaid is intended to limit the scope of the claims appended hereto.

What is claimed is:

1. Filter apparatus for removing and collecting particulate matter from a turbulent stream of gas comprising:
    a tubular bag of porous material open at one end thereof and closed at the other end thereof;
    and a plurality of thin, flexible strands disposed longitudinally of said bag in spaced relation about the inner tubular surface thereof,
    each of said strands being attached to the inner tubular surface of said bag at least at two points thereon;
    slack being provided in each of said strands between its points of attachment;
    said strands being operative upon the introduction of said turbulent stream of gas into said bag to sweep said inner tubular surface along substantially the entire length of said strands between their points of attachment.

2. The filter apparatus claimed in claim 1 wherein said strands have a length between said points of attachment approximately 5% greater than the distance between said points of attachment.

3. The filter apparatus claimed in claim 2 wherein said strands are spaced from adjacent strands no more than will just permit said strands to overlap said adjacent strands, thus to be operative upon overlapping areas of said inner tubular surface.

4. The filter apparatus claimed in claim 3 wherein said strand spacing bears a relation of approximately 1:8.2 to the distance between said points of attachment.

5. The filter apparatus claimed in claim 3 wherein each strand is attached to said bag at least at one intermediate point on said inner tubular surface.

6. The filter apparatus claimed in claim 3 wherein each of said strands is attached to said bag on the inner tubular surface at said one end thereof, at approximately the center of said other end thereof and at approximately the point where said other end joins said inner tubular surface thereof, said slack being provided in each of said strands between each of its points of attachment.

7. The filter apparatus claimed in claim 6 wherein said strand spacing bears a relation of approximately 1 to 8.2 to the distance between said points of attachment at said one end and at approximately said point where said other end joins said tubular surface.

8. The filter apparatus claimed in claim 7 wherein each strand is attached to said bag at least at one intermediate point on said inner tubular surface.

References Cited by the Examiner

UNITED STATES PATENTS

| 523,652 | 7/94 | Heine | 55—300 |
| 984,810 | 2/11 | Green | 55—305 |
| 1,026,553 | 5/12 | Baxter | 55—300 |

FOREIGN PATENTS

| 4,494 | 4/79 | Germany. |
| 582,935 | 8/33 | Germany. |
| 18,013 | 1909 | Great Britain. |
| 24,115 | 12/14 | Great Britain. |
| 282,743 | 5/28 | Great Britain. |

HARRY B. THORNTON, *Primary Examiner.*